(12) United States Patent
Holl

(10) Patent No.: US 8,298,493 B2
(45) Date of Patent: Oct. 30, 2012

(54) HEAT EXCHANGE APPARATUS

(76) Inventor: Richard A. Holl, Camarillo, CA (US)

( * ) Notice: Subject to any disclaimer, the term of this patent is extended or adjusted under 35 U.S.C. 154(b) by 150 days.

(21) Appl. No.: 12/972,319

(22) Filed: Dec. 17, 2010

(65) Prior Publication Data

US 2012/0152508 A1 Jun. 21, 2012

(51) Int. Cl.
*F28D 21/00* (2006.01)
*B01J 8/08* (2006.01)

(52) U.S. Cl. ........ 422/205; 422/198; 422/202; 422/209; 165/177; 165/179

(58) Field of Classification Search .................. 422/198, 422/202, 205, 209; 165/177, 179
See application file for complete search history.

(56) References Cited

U.S. PATENT DOCUMENTS 4,593,754 A * 6/1986 Holl ............................ 165/109.1
7,575,728 B2 * 8/2009 Holl et al. ..................... 422/606

* cited by examiner

*Primary Examiner* — Walter D Griffin
*Assistant Examiner* — Lessanework Seifu

(57) ABSTRACT

The heat exchange apparatus provides a flow passage for the heat exchange fluid comprising a succession of flow passage chamber portions separated from one another by intervening throttle forming passage portions of smaller cross section, and therefore of smaller flow capacity, transverse to the flow direction, so that the heat exchange fluid moves at a higher velocity in the throttle forming portions than in the chamber portions. The fluid is moved at a rate such that its velocity in the throttle forming portions is high enough to reduce the thickness of the fluid boundary layer on the passage wall and thereby facilitate the heat exchange. Alternatively, or in addition, the velocity is high enough to at least reduce the rate of fouling of the passage wall surface. Alternatively, or in addition, the fluid flows as eddy vortices, the spacing of the chamber portions along the passage being such that wake interference flow is established which enhances the rate of heat exchange. The exchanger is intended principally for use in combination with a spinning tube in tube reactor with a very small annular cross section reaction passage between them, the exchanger also being of tubular form with the stator tube constituting a wall of the heat exchanger.

21 Claims, 3 Drawing Sheets

HEAT EXCHANGE APPARATUS

FIELD OF THE INVENTION

The invention is concerned with new heat exchange apparatus and especially, but not exclusively, to heat exchange apparatus for use in combination with flow-through chemical reactors of the type usually known as micro-reactors.

BACKGROUND OF THE INVENTION

It is fundamental in the chemical industry that the temperature at which a particular reaction is carried out may be critical for successful optimum operation, and therefore it must be maintained within a specific range, which can be very narrow. Variations in the temperature outside this range can, for example, cause unwanted side reactions to occur, reducing the output of the wanted side product, and often requiring expensive further processing to remove the unwanted product or products. Chemical reactions are almost invariably either exothermic or endothermic, and reactions that do not involve heat generation or absorption are rare, so that it is usually essential to provide in combination with the reactor some means for adequate and precise heat exchange away from or into the reacting reactants in the reaction passage(s) or vessel.

Chemical and physical reactions cannot occur until molecules of the reagents are brought together one-on-one, and the required physical interaction is greatly facilitated as the reagents are more and more intimately mixed together. Bulk stirring is only able to the cause the reagent molecules to contact one another after sufficient time has elapsed to provide the necessary inter-dispersion. Typically the initial stirring shows bulk interaction taking place very quickly, for example within minutes, but interaction then slows considerably and satisfactory mixing may take several days to accomplish. One phenomenon that inhibits quick inter-dispersion is that the reagents in the bulk liquid inevitably are in the form of discrete bodies thereof, these bodies comprising what are known as Kolmogoroff smallest eddies or vortices, of dimension usually about 15-30 microns, which considerably reduce the possibility of the desired one-on-one molecular contact. Consequently, inside such Kolmogoroff eddies, only natural molecular diffusion can accomplish such one-on-one contact, which is a very slow process. The required encounters can be helped to occur by making the reactor of small enough scale that the dimensions of its reaction passage or passages are very small, ideally of the order of magnitude of the Kolmogoroff eddies, so that molecular diffusion now becomes much more significant. The role of such a reactor, and the mixing and mass transfer equipment associated with it, is to create sufficiently small scale fluid structures or eddies that the uniformity of mixing, mass transfer and molecular inter-diffusion is improved. Such reactors are generally referred to as micro-reactors, and many different types have been proposed. Micro reactors have the inherent property that the reactions involved take place within them at extremely high reaction rates, often requiring only milliseconds residence in the reaction passage. The provision of precise temperature control is exacerbated by the very small size and the special structures of such reactors.

There is described and claimed in my U.S. Pat. No. 7,780,927, issued 24 Aug. 2010, the disclosure of which is incorporated herein by this reference, what is now generally known as a spinning tube in tube reactor which, as its name implies, comprises a first cylindrical tube mounted within a second cylindrical tube of larger diameter, the tubes being relatively rotatable about a common longitudinal axis with the operative exterior surface of the inner tube spaced radially a very small distance (e.g. 300 micrometers or less) from the cooperating operative interior surface of the surrounding tube to provide an annular passage in which the reaction takes place. Usually the inner tube comprises a rotor, while the outer tube comprises a stator, although if required both tubes may be mounted for rotation. Tube in tube reactors with such small radial dimensions of the reaction passage come within the category of micro-reactors. The tubes usually are of uniform diameters along their lengths so that the reaction passage is of uniform radial spacing along its length, and through which the reactants pass while subjected to intense shear produced by their movement through the narrow passage, and by the relative rotation between the opposite tube surfaces. The reactor disclosed in this patent solves what has hitherto been a major problem with such reactors of ensuring that adequate uniformity is maintained in the radial spacing between the operative surfaces, despite the extremely small radial dimension. This is done by suspending the rotor within the stator solely by a flexible rotation-transmitting coupling and rotating the rotor at a speed such that the spacing is maintained by the hydrodynamic lubrication effect that occurs in the reactant liquid or liquid mixture passing upward in the reaction passage, which is of sufficiently small radial dimension for this phenomenon to occur.

In a reactor as described in the preceding paragraph the heat exchange structure will usually surround the stator so that the wall thereof is the heat exchanger member through which heat exchange takes place. It is of course possible to provide heat exchange means within the rotor with its wall as the corresponding heat exchange member, but this introduces practical difficulties of feeding the heat exchange fluid to the interior of the hollow rotating rotor without leakage, and removing it therefrom. Owing to the usual very small radial dimension of the reaction passage heat transfers very rapidly into or out of the passage while the temperature gradient in the radial direction remains sufficiently constant, so that normally it is sufficient to provide heat exchange means only with the stator. The size of the heat exchange structure is determined by the size of the reactor, or any other apparatus with which it is used, and therefore necessarily is small when the apparatus is small. The exchanger must therefore be as efficient as possible, and to this end it is preferred that the flow of heat exchange fluid through the heat exchanger passage or passages is laminar. Heat exchangers of the invention are able to provide such a flow which results in high heat exchange capability.

A phenomenon that can deleteriously affect the rate of heat transfer from a heat exchanger to its associated apparatus is that its flow passage or passages inherently have at the surfaces of their intervening walls a stationary layer of the heat exchange fluid through which the exchanging heat must pass. This is usually referred to as a boundary layer, and in the presence of a smooth flow will progressively increase in thickness up to a maximum value dependent on the fluid composition and its velocity. The boundary layer insulates the main body of the heat exchange fluid from the walls of the passage through which it is flowing and it is therefore of considerable advantage to keep this layer as thin as possible. One way of doing this is to interrupt the smooth fluid flow at appropriate intervals and in a way that the barrier layer thickness becomes as close to zero as possible; it will of course immediately begin to thicken again, so that the interruptions must be continued. The problem involved is to obtain successive continuous interruptions in the fluid flow without producing a flow that will increase the pumping pressure to an uneconomical value.

A constant problem with heat exchangers is the tendency for material from the heat exchange fluid to deposit on the walls of the heat exchange passage in which it is flowing. This material, however it originates, is generically referred to as "fouling material" and is deleterious to optimum operation of the heat exchanger by reducing the flow capacity of the heat exchange passage, and by reducing the rate of transfer of heat between the heat exchanger and the reactor through the intervening wall coated with the fouling material. The problem is especially difficult in heat exchangers employed with micro reactors owing to the necessarily small dimensions of the passages, so that the particles of fouling material can more easily block the fluid flow, and it is not unknown for the passages to require cleaning of the fouling material therefrom every few hours. The problem has been attacked from a number of different ways, such as using special heat exchange fluids, which may also be a highly purified, but these are usually expensive. Fouling can be substantially reduced, and even avoided, by moving the heat exchange fluid through the passage above a threshold velocity such that the fouling material can no longer adhere to the surface, but this usually requires such high pumping pressures as not to be economical, so that it is usually preferred instead to employ a lower pressure and accept that the exchanger must be cleaned at appropriate intervals.

SUMMARY OF THE INVENTION

It is a principal object of this invention to provide new heat exchange apparatus providing enhanced rates of heat exchange and particularly, but not exclusively, to provide such apparatus which can readily be combined with spinning tube in tube reactors, and even more particularly, but not exclusively, which can readily be incorporated with spinning tube in tube micro reactors.

It is another object to provide new heat exchange apparatus and particularly, but not exclusively, to provide such apparatus which can readily be incorporated with spinning tube in tube reactors, and even more particularly, but not exclusively, which can readily be incorporated with spinning tube in tube micro reactors, in which the flow of heat exchange fluid in the flow passage or passages has the form of laminar flow eddies, and preferably such eddies spaced along the flow path to exhibit wake interference flow of eddies immediately in front and behind of each of a series of eddy producing elements.

It is a further object to provide new heat exchange apparatus and particularly, but not exclusively, to provide such apparatus which can readily be incorporated with spinning tube in tube reactors, and even more particularly, but not exclusively, which can readily be incorporated with spinning tube in tube micro reactors, in which minimization of the thickness of the boundary layer in the heat exchanger flow passages is produced by the structure of the heat exchanger, with the consequent possibility of increase of efficiency of the heat exchanger.

It is a still further object to provide new heat exchange apparatus and particularly, but not exclusively, to provide such apparatus which can readily be incorporated with spinning tube in tube reactors, and even more particularly, but not exclusively, which can readily be incorporated with spinning tube in tube micro reactors, in which fouling in the flow passage or passages of the heat exchanger is inhibited by the structure of the heat exchanger.

In accordance with the invention there is provided heat exchange apparatus comprising a heat exchange wall through which heat exchange takes place from one wall surface to an opposite wall surface;

a heat exchange structure disposed at the one wall surface and providing a flow passage for the flow therein in a flow direction of heat exchange fluid in heat exchange contact with the one wall surface;

the flow passage comprising a succession of flow passage chamber portions, each of which is connected to any preceding and successive flow passage chamber portion by a respective flow passage throttle forming portion, both the chamber and the throttle forming portions having the flow passage one wall as a wall thereof, the throttle forming portions being of smaller flow cross section transverse to the flow direction than that of the connected associated flow passage chamber portions; whereby heat exchange fluid passing in the flow passage has a higher velocity during its passage through the throttle forming portions than in the passage chamber portions;

the apparatus also comprising means for moving the heat exchange fluid through the flow passage at a flow rate such that its velocity, at least in the throttle forming portions, is high enough to reduce the thickness of the heat exchange fluid boundary layer in the throttle portions, and thereby facilitate heat exchange from the heat exchange fluid to the one wall surface.

Alternatively, or in addition, the apparatus comprises means for moving the heat exchange fluid through the flow passage at a flow rate such that its velocity, at least in the throttle forming portions, is high enough to at least reduce the rate of fouling of the one wall surface.

Alternatively, or in addition, the apparatus also comprises means for moving the heat exchange fluid through the flow passage at a flow rate such that the heat exchange fluid flows in the flow passage chamber portions as laminar eddies contacting the one wall surface, and that the spacing of the flow passage chamber portions along the flow passage is such that wake interference flow is established in the flow passage to thereby enhance the rate of heat exchange between the heat exchange fluid and the one wall surface.

Preferably the heat exchange structure comprises a heat exchanger body providing in the flow passage in the flow direction a succession of ridges each extending from a wall of the heat exchange fluid flow passage transverse to the flow direction and toward the one wall surface, each two immediately succeeding ridges in the direction of flow having a respective trough between them, each ridge having a ridge crest that is the part of the ridge closest to the one wall and each trough having a trough bottom that is the part of the trough furthest from the one wall, each ridge forming in the flow passage a corresponding throttle forming passage portion and each trough forming in the flow passage a corresponding chamber portion.

Each ridge may be of triangular cross section transverse to the flow direction with a ridge crest that is convex toward the one wall, and each trough of triangular cross section transverse to the flow direction with a trough bottom that is concave toward the one wall; the heat exchange wall may be a cylinder of uniform diameter along its length and the heat exchanger body cylindrical having the heat exchange wall as an interior wall thereof; wherein A is the radial dimension of the ridges from the heat exchange wall and B is the radial dimension of the troughs from the heat exchange wall, and the value of the ratio A/B is in the range 0.1 to 0.35.

DESCRIPTION OF THE DRAWINGS

Apparatuses that are particularly preferred embodiments of the invention will now be described, by way of example, with reference to the accompanying diagrammatic drawings, wherein.

DESCRIPTION OF THE INVENTION

Figure 1:
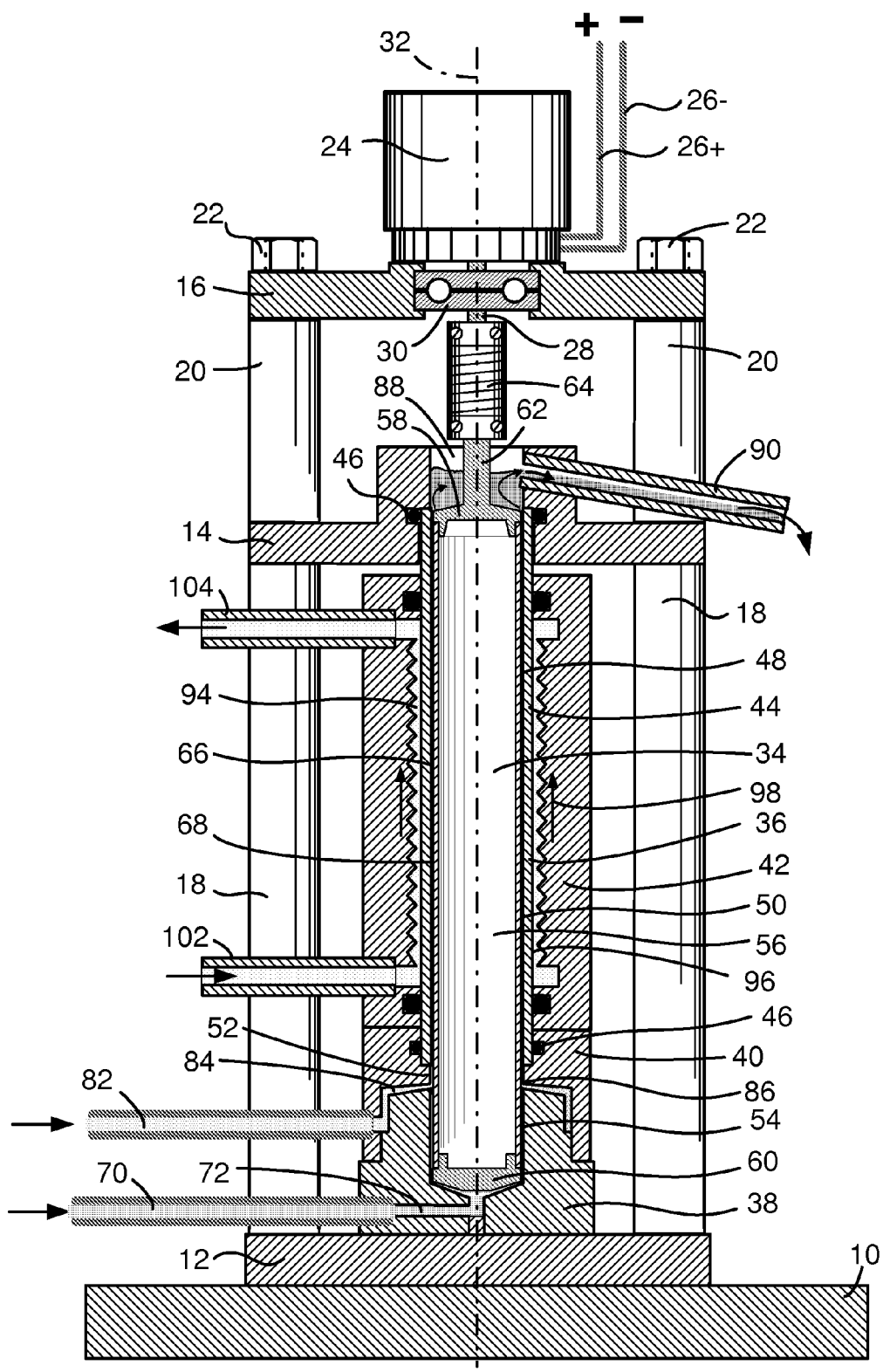
FIG. 1 is a cross section taken on a vertical longitudinal axis of a spinning tube in tube micro reactor in combination with a heat exchanger of the invention, in order to illustrate the principal construction features of the heat exchanger.

The main frame of the apparatus comprises a flat main base member 10 on which is disposed a flat sub-base plate 12, a spaced parallel intermediate and stator support plate 14 and a spaced parallel uppermost and motor support plate 16. The members 12 and 14 are held spaced apart by interposed tubular members 18 (only two are shown), and the members 14 and 16 are held spaced apart by interposed tubular members 20 (again only two are shown), the whole assembly being held in tight engagement by tie-rods 22, each of which passes through a respective pair of tubular members 18 and 20. A controllable speed electric drive motor 24, which receives its operating electric power through leads 26+ and 26−, is mounted on the support plate 16 with its drive shaft 28 extending vertically downward through a bearing 30, the length of the drive shaft being sufficient for it to extend below the support plate 16. The axis of rotation of the motor and its shaft is vertical and is indicated by the broken line 32 This axis 32 also constitutes a common central axis of rotation for the motor shaft, and for a cylindrical tubular rotor 34 rotatably coaxially mounted within a cylindrical tubular stator formed by a number of coaxial parts and indicated generally by the reference 36, the rotor and stator together constituting a spinning tube in tube chemical reactor. The bearing 30 ensures that the rotor cannot move vertically downward by its weight, or upward by operating thrust from the reacting material pumped through the reactor.

The parts from which the reactor stator 36 is formed comprises an upwardly opening cup-shaped base member 38 fastened to the top face of the sub base plate 12, an annular intermediate member 40 mounted on top of the base member 38, and an annular upper member 42 mounted on the upper face of the intermediate member 40. A cylindrical stator tube 44 of uniform diameter along its length extends between the members 14 and 40 with its ends inserted in respective counter-bores therein. Sealing against gas and liquid leaks between the tube 44 and the counter-bores is ensured by O-rings 46 at the top and bottom tube ends. Cylindrical inside surface 48 of the tube 44 constitutes an upper part and the majority of the stator operative surface of an annular reaction passage 50 formed between the stator inner surface and its cooperating rotor outer surface, as will be described below. The cylindrical inside surface 52 of the annular intermediate member 40 and the cylindrical inside surface 54 of the cup-shaped opening in the base member 38 are of precisely the same diameter as the tube inside surface 48 and constitute the bottom minor part of the stator operative surface. The members are mounted with these surfaces precisely aligned with one another coaxially with the axis 32, so that together they may be treated as a single continuous surface constituting the stator tube inner operative surface. For convenience therefore hereinafter this stator operative surface will be referred to using the single number reference 48 of the tube surface. The stator walls are made as thin as possible so as to make as small a heat sink as possible.

The rotor in this embodiment comprises a thin walled tube 56 having its upper and lower ends fixed respectively in upper and lower end members 58 and 60. The upper end member 58 has protruding upwardly therefrom a cylindrical shaft 62 coaxial with the axis 30, the upper end of this shaft 62 being connected to the lower end of the motor drive shaft 26 by a flexible coupling 64, whereby the rotor is suspended vertically within the stator with complete angular and axial freedom while it is rotated. This flexible coupling suspending the rotor from the motor shaft 28 constitutes the sole means by which the rotor is mounted within the stator. The inner cylindrical surface 48 of the stator tube 44 and the outer cylindrical surface 66 of the rotor tube 56 are coextensive with one another about the axis 32, so that an annular reaction chamber or passage 68 of small and constant radial dimension along its length is formed between them, these two surfaces constituting the operative surfaces of the reaction passage. The wall of the rotor tube is made as thin as possible with a completely hollow interior so as to make as small a heat sink as possible for when the operating temperature in the reaction passage must be controlled and maintained within a predetermined range.

In this embodiment the reactor is provided with only two vertically spaced fluid entry means for respective reaction reagents, but in other embodiments more than two can be provided; usually the first reagent entry will be at the bottom end of the reaction passage with the other entry means spaced at appropriate distances upward along its length. It is important that the reactor be operated with the axis 32 vertical, that at least one of the reagents is a liquid, and that the mixture of reacting reactants be fed into the lower end of the reaction passage with the resulting product discharging from the upper end of the passage. If only one of the reagents is a liquid this is fed into the reaction passage through the bottommost entry means. In this embodiment a lower entry means for such a first liquid reactant comprises a pipe 70 connecting with a passage 72 in the lower end of the cup shaped base member 38, the passage discharging into the bottom of a cup shaped opening therein. The pipe is connected to a respective supply 74 thereof (see FIG. 2) via a respective precision metering pump 76. The reagent is thereby delivered to the lower end of the reaction passage, in which it passes upward in the form of a correspondingly thin cylindrical film of uniform radial thickness.

A higher entry means for a second reactant received from a respective supply 78 thereof (see FIG. 2) under the action of a respective precision metering pump 80 comprises a pipe 82 discharging into an annular plenum 84 that is centered on the axis 32 and is formed between the lower end of the intermediate member 40 and the upper end of the cup-shaped member 38. The plenum feeds the second reactant into the reaction passage through a ring shaped slit inlet 86 completely surrounding the rotor surface without a circumferential break therein, again centered on the axis 32, and formed between the two members 38 and 40. This inlet delivers the second reagent into the reaction passage 50 in the form of a thin film thereof, whereupon, together with the first reagent, it is immediately subjected to the intense shear resulting from its upward movement within the extremely narrow reaction passage and the relative rotation between the stator and rotor surfaces. The slit is of very small axial dimension, e.g. of the order of 0.01-2.00 millimeters, so that the film it produces is of corresponding very small thickness dimension. The mixed and reacting reactants continue upward in the reaction passage and the reacted product emerges therefrom into a reception chamber 88 provided in an upwardly extending part of the intermediate stator support plate 14, from which it passes via an overflow pipe 90 to a reservoir 92 for any further processing that is required. It will be noted that during the passage of the reactants into the reaction passage and emergence of the reaction product therefrom there is no need for seals to prevent leakage, apart from the upper O-ring 46.

As is described in detail in my U.S. Pat. No. 7,780,927, issued 24 Aug. 2010, referred to above, and to which reference may be made, it is of particular advantage for the reaction passage to be as uniform as possible in its radial dimension along its length to ensure that the reaction conditions are maintained correspondingly uniform. This has proven difficult to achieve in prior structures of which I am aware in which the rotor is mounted by bearings for its rotation within the stator, owing to the usual small radial dimension of the reaction passage and the usual manufacturing tolerances associated with even the most precisely made bearings, plus the increase in such tolerances over time owing to wear. Unexpectedly, it has been found possible to avoid the need entirely for such bearings by suspending the rotor freely within the stator using only a flexible coupling or couplings between it and its drive means that provide complete angular and axial freedom for its rotation. The radial dimension of the reaction passage in a spinning tube in tube reactor is usually of the order of 50-200 micrometers, while the speed of relative rotation between the cooperating stator and rotor surfaces is relatively high, for example from 5 to 100,000 rpm, more usually in the range 15,000 to 30,000 rpm, producing shear rates in the annular reaction passage within the range of 50,000/sec to 500,000/sec, more usually in the range 100,000/sec to 300,000/sec.

It is known from tribology, the study of friction and wear of engineering materials, that when two relatively moving surfaces that conform with one another, having a thin layer of a lubricant between them are subjected to a load that causes them to converge, a counteracting force from the liquid wedge drawn into the converging space develops and keeps the solid surfaces apart. The lubricant layer is described as hydrodynamic and the phenomenon is sometimes described as the squeeze-film effect. Thus, where according to conventional theory the load should cause the surfaces to contact one another, in fact the integrity of the interposed film is maintained and no such contact occurs. It seems that it is this hydrodynamic effect which ensures that any small divergence of the rotor from its precisely centered position within the stator produces a sufficient corresponding local hydrodynamic counter-reaction returning the rotor immediately to the centered position. Such a reactor provides very high rates of uniform micro-mixing. For example, it is possible to achieve such uniform mixing within a period of less than 5 milliseconds during which the mixing reagents have moved a distance of less than 5 mm (0.2 in). Thereafter, the already uniformly interspersed reactants are subjected to intense, forced, molecular inter-diffusion caused by the high shear rates obtained between the relatively rotating surfaces 48 and 66.

In practice, as explained above, in most cases it is essential to provide any chemical reactor with heat exchange means to control the temperature of the reacting reactants. In this embodiment the reactor is provided with heat exchange means using the annular body 42 as the operative heat exchange structure, which provides an annular heat exchange fluid flow passage 94 having external cylindrical wall surface 96 of the tube 44 as the wall thereof through which heat is to be exchanged. In this embodiment the heat exchange fluid is made to flow in the same direction as the reacting reagents in the reaction passage 50, namely vertically upward, as indicated by arrows 98, although in other embodiments a counter flow system may be preferred. Thus, heat exchange fluid at a predetermined temperature is fed from a thermostatically controlled external heat exchange pump unit 100 via lower inlet pipe 100 to the lower end of the passage 94. The heat exchange fluid that issues from the top end of the passage 94 is returned to the pump unit 100 via an upper outlet pipe 104. The flow passage 94 in this embodiment is necessarily of annular cross section transverse to the apparatus axis 32, specifically at a right angle thereto, since it is providing heat exchange to the tubular annular chemical reaction passage 50, but it can be of any other shape or configuration as is required by the shape or configuration of the wall through which the heat exchange is to take place. Thus, in this embodiment the wall 96 is convex radially outward, but in other embodiments may be concave, or flat, or spherical, or ovoid, etc.

The heat exchange capacity of the flow passage 94, and therefore of the wall 44, is maintained as high as possible by producing a specific type of fluid flow in the passage, namely one in the form of laminar flow eddies, as will be described in more detail below. In particular, preferably, the structure of the passage 94 is made such that the fluid forms a succession of such laminar flow eddies with advance and wake eddies at each throttle forming passage portion coinciding or overlapping with one another to obtain what is known as wake interference flow of the body of heat exchange fluid that engages the boundary layer that is always present at the wall surface 96 and through which the heat to be exchanged must pass, thereby providing particularly efficient heat exchange. Such wake interference flow is described, for example, on page 166 in the publication "Turbulence Phenomena" by J. T. Davies, published 1972 by The Academic Press, together with the consequent possibility of increase in the efficiency of the heat exchange produced.

Another way in which the efficiency of the heat exchanger can be improved is to provide a fluid flow through the passage 94 in which the boundary layer is kept as thin as possible along its operative length, so that the bulk of the heat exchange fluid is able to exchange heat with the wall surface 96 through this layer without requiring unacceptably high pumping pressures from the unit 100. The boundary layer thickness in this embodiment is the thickness of the viscous boundary layer region of the heat exchange liquid flowing along the solid, smooth outer surface of the external cylindrical wall surface of the stator tube. Because the main effect of the viscosity of a fluid is to slow the fluid near a wall, the border of the viscous region is found at the point where the fluid velocity is essentially equal to the free-stream velocity. In a freely developing boundary layer, the fluid asymptotically approaches the free-stream velocity as one moves away from the wall, so it never actually equals the free-stream velocity. Conventionally (and arbitrarily), the outer border of the boundary layer is defined to be the point at which the fluid velocity equals 99% of the free-stream velocity.

Another way to maintain the heat exchange capacity of the wall 44 and wall surface 96, and therefore of the flow passage 94, is by at least inhibiting, and if possible preventing entirely, the deposition of fouling material on the wall surface 96. This beneficial effect is obtained with heat exchangers of the invention by the structure of the fluid flow passage 94, and also by the conditions under which the heat exchanger is operated, wherein at spaced intervals in the flow path the velocity of the heat exchange fluid is at, or above, a threshold value at which fouling material will not adhere to the wall, or if deposited thereon will not remain adhered, without the need for uneconomically pumping pressure to move the heat exchange fluid through the passage 94 at a velocity above the threshold value.

Figure 2:
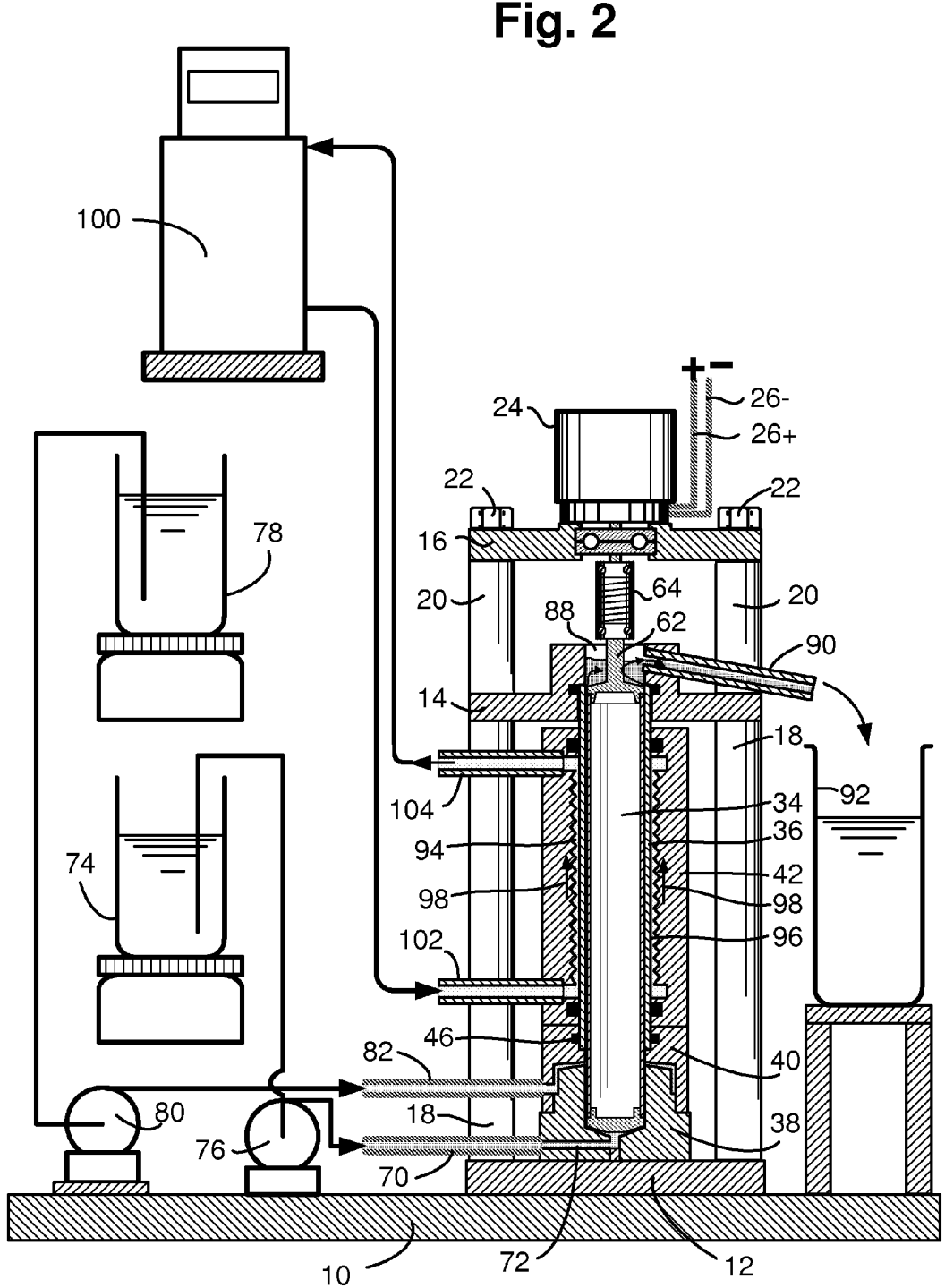
FIG. 2 is a schematic diagram showing the spinning tube in tube reactor/heat exchanger combination of FIG. 1, together with other apparatus required to form a complete chemical reactor system.
Figure 4:
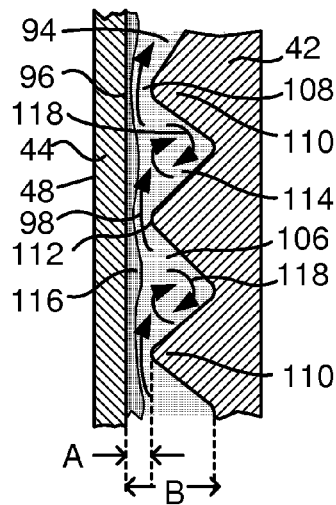
FIGS. 4, 5 and 6 each shows a portion only of the heat exchange wall, as in FIG. 3, showing respective alternative profiles for transverse ridges forming successive chamber portions and throttle forming portions.

Referring now particularly to FIGS. 1, 2 and 4, these beneficial results can be obtained by making the flow passage 94 in the form of a succession of flow passage chamber portions 106 of larger flow capacity, each of which is connected to any preceding and successive flow passage chamber portion by a respective throttle forming passage portion 108 which is of smaller flow capacity than the immediately preceding and following chamber portions. Both of the portions 106 and 108 have the flow passage wall surface 96 as a wall surface thereof. The throttle forming passage portions 108 are of smaller flow cross section transverse to the fluid flow direction than that of the associated flow passage chamber portions 106. Therefore, with a unitary rate of flow throughout the passage 94 the fluid has a higher velocity as it passes through the throttle forming passage portions 108 than in the passage chamber portions 106. In this embodiment, in which the flow passage 94 has an annular transverse cross section, these changes in flow capacity and transverse flow cross sections are most easily obtained by making the radial dimension of the passage smaller in the throttle forming passage portions than in the chamber portions while, keeping the circumferential dimensions the same.

Figure 5:
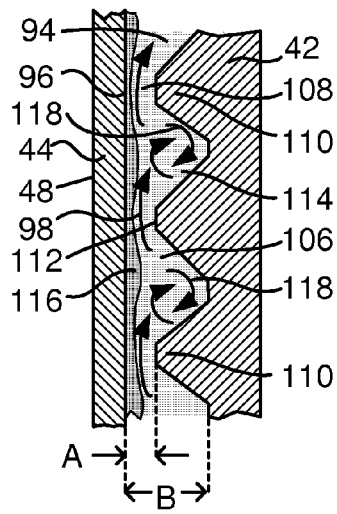
Figure 6:
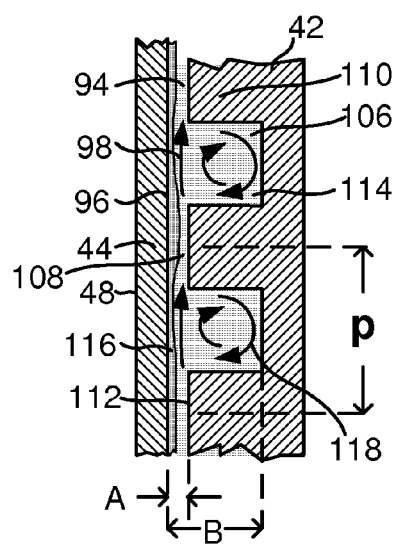

Thus, the successions of chamber passage portions 106 and throttle forming passage portions 108 are provided by means of a corresponding succession of ridges 110, of triangular cross section parallel to the fluid flow direction, as indicated by the arrows 98. The ridges extend from the mass of the heat exchanger body 42 into the heat exchanger flow passage 96 transverse to the fluid flow direction and toward the heat exchange wall surface 96. Each ridge has a transverse circular shape crest 112 that is the part of the ridge closest to the wall surface 96, and therefore the location at which the radial dimension of the passage 94 and its fluid flow capacity are at a minimum. Each pair of immediately successive ridges has between them a transverse circular shape trough or groove, the bottom 114 of which is furthest from the wall surface 96, and is therefore where the radial spacing of the passage 94 and its flow capacity are at a maximum. In the embodiment illustrated by FIG. 3, both the ridges and the troughs are of triangular longitudinal cross section with respectively a pointed top and a pointed bottom, so that the ridge crests and the trough bottoms both have the form of circular shape line edges transverse to the direction of flow and centered on the axis 32. Other configurations are also possible. For example, as shown in FIG. 4, the ridge crests 112 are rounded convex; the trough ridges 114 can have similar profiles in which case they are rounded concave toward the wall surface 96. As shown in FIG. 5, the crests 112 are truncated triangular; again the ridge troughs 114 can be similarly profiled. As shown in FIG. 6 the crests 112 are flat and parallel to the wall surface 96 and to the axis 32, as are the ridge troughs 114. All of these structures have the commercial advantage that they can be manufactured relatively inexpensively using a standard internal thread cutting machine, which may be set to cut individual ridges spaced in the direction of fluid flow, or may cut a continuous internal thread which will perform similarly to individual longitudinally spaced ridges.

Figure 7:
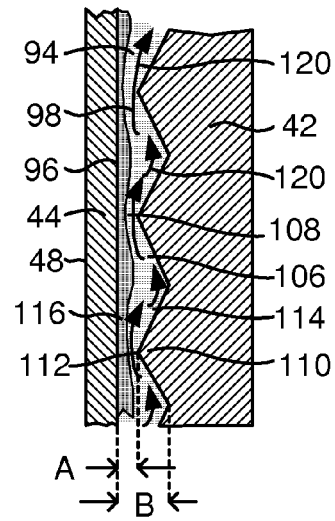
FIG. 7 shows a portion only of the heat exchange wall of the heat exchange apparatus/chemical reactor combination of FIG. 1, also drawn to a much larger scale, and to facilitate the description of the aspects of the invention involving maintenance of the thickness of the fluid boundary layer at a consistent low value and involving preventing deposition of fouling material on the wall through which heat exchange is to take place at lower rates in the absence of the wake interference phenomenon.

All of the heat exchanger structures of the invention require a difference in the flow capacities between the chamber passage portions 106 and the throttle forming portions 108, and this difference can be expressed as the ratio Fc/Ft, where Fc is the flow capacity of the chamber passage portions and Ft is that of the throttle forming portions. In the embodiments illustrating the invention, and employing ridges to produce the throttle and chamber forming portions and to produce non-turbulent eddies in the flow in the chambers, the differences in the flow capacities corresponds to the differences between the minimum radial dimension A of the ridges from the wall surface 96, and the maximum radial dimension B of the troughs from the wall surface 96, since all other dimensions remain constant, and the ratio A/B will correspond with the ratio Fc/Ft. As specific examples, with the embodiments illustrated, the preferred range of values for the ratio A/B is from 0.1 to 0.35. At ratios at or above the value 0.35 the flow obtained in the passage 94 will be as illustrated in FIG. 7, namely laminar throughout the length of the passage; such a flow does not give as high values of heat exchange as the structure of FIGS. 3-6, but does retain the advantages of keeping the thickness of the flow boundary layer 116 at or below a desired maximum value and inhibiting the deposition of fouling material on the wall surface 96, as will be described in more detail below.

Figure 3:
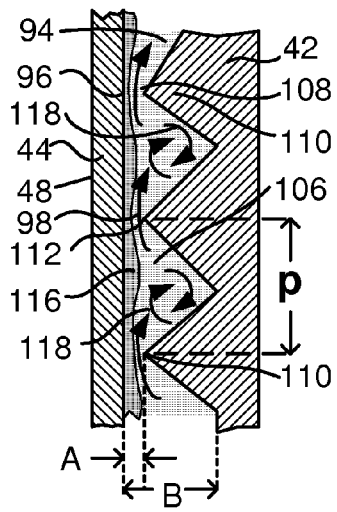
FIG. 3 shows a portion only of the heat exchange wall of the heat exchange apparatus/chemical reactor combination of FIG. 1, drawn to a much larger scale to facilitate the description of the aspect of the invention involving establishment in the flow passage of fluid flow in the form of laminar eddies exhibiting wake interference flow.

In each of the structures shown in FIGS. 1 through 6 the ratio A/B is elected such that laminar flow eddies, indicated by the arrows 118, are produced in the larger flow capacity chamber passage portions 106. These eddies are of shape and rotational frequency that depend upon the geometry of the structure. Wake eddies will be produced immediately behind the throttle passage portions downstream of the flow, while advance eddies will be produced in front of the throttle passage portions upstream of the flow, and if the spacing between the ridge crests 112, referred to herein as the pitch P, as shown in FIG. 3, is made such that the wake eddies and advance eddies at the throttle forming portions 108 coincide, then what is known as wake-interference flow is obtained. As long as turbulent flow is avoided, which would cause friction drag, the flow is effectively laminar and very efficient non-turbulent mixing is obtained between the boundary layer 116 and the core or bulk of the moving fluid, with corresponding increase in efficiency of heat transfer. Turbulent flow may be distinguished from eddy flow in that the former is irregular with no observable pattern, as is found with eddies. Eddies and swirls do not constitute turbulence with its attendant friction losses and consequent need for substantial increase in pumping power.

Figure 8:
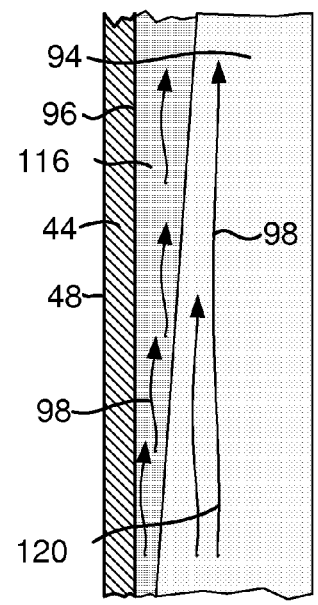
FIG. 8 shows a portion of a heat exchange wall of a passage in a prior art heat exchanger, illustrating the increase in thickness of the boundary layer of heat exchange fluid flowing in the passage when no attempt is made to maintain its thickness at a consistent low value.

FIG. 8 shows what happens to boundary layer 116 of the bulk fluid flowing at a uniform rate in a passage 94 in the direction of arrows 98 when no action is taken to reduce its thickness. The layer increases progressively in thickness until it reaches the maximum value set by the viscosity of the fluid, the dimensions of the passage 94 and the rate of flow. This is to be contrasted with the structures illustrated by FIGS. 3 through 6, in which laminar eddy flow is present, and also in the structure of FIG. 7, in which the value of the ratio A/B is too high for laminar eddy flow to be obtained. In the embodiment of FIG. 7 the flow is eddyless, as is indicated by the arrows 120, following the contour of the flow passage without forming eddies therein, as it moves from a passage chamber portion to a throttle forming portion, and vice versa. Nevertheless, as with the other embodiments, the invention provides the considerable advantage that the increased flow velocity obtained in the throttle forming portions disrupts the boundary layer 116 sufficiently to cause its thickness to be reduced back to a minimum value in each of those portions. The throttle forming portions are sufficiently closely spaced that the boundary layer thickness is kept below a desired maximum along the whole length of the flow passage. The pump unit 100 is made to deliver the heat exchange fluid to the passage 94 at a flow rate such that it moves through the flow passage at a velocity, at least in the throttle forming passage portions 108, which is high enough to reduce the thickness of the adjacent heat exchange fluid boundary layer down to equal or below the desired maximum, and thereby facilitate the heat exchange between the heat exchange fluid and the wall surface. In apparatus as illustrated of the present invention, the boundary layer 116 may attain a thickness of between 0.5 mm and 1.5 mm, depending on the liquid viscosity and overall liquid temperature selected.

It is known that fouling of a heat exchanger wall surface, such as the surface 96, can be considerably reduced, or even completely eliminated, if the heat exchange fluid can be passed over the wall surface at a velocity sufficient to ensure that the fouling material cannot deposit on the surface, or if deposited cannot remain adhered to the surface. With a smooth uniform flow throughout the heat exchanger passages, such as is illustrated by FIG. 8, this will usually require production of excessively high pumping rates by the pump unit 100, to the extent that it may be more economical to accept that fouling occurs and periodically clean out the passages. The structures of the invention, in which successive bouts of higher flow velocity are obtained in the throttle forming portions over quite short lengths of the passages, means that economical lower pumping rates can be employed, while achieving in and adjacent to the throttle forming passage portions flow velocities that are high enough to at least reduce, and otherwise inhibit, fouling deposition. As has been described above, heat transfer surface fouling on the wall surface of tube 44 can be prevented by maintaining a so called threshold velocity above which fouling can no longer occur due to the onset of a scouring action of the liquid rushing along the smooth surface. Typically the threshold flow velocity in passages such as the passage 94 may be in the range from 0.5 m/sec to 2.2 m/sec, above which an effective surface scouring effect can take place.

In preferred embodiments, intended primarily for prototype experimentation and determination of reaction parameters for use in commercial applications, rotor tube 34 will be of diameter in the range 0.5 to 50 cm, more usually in the range 3 to 10 cm. The diameter of the rotor tube of course also determines the diameter of the stator tube 36 and the associated bores in the parts 38, 40 and 42. The length of the reaction passage 68, upon which of course the lengths of the component parts will depend, will be in the range 5.0 to 100 cm, more usually in the range 10 to 50 cm, while the controllable drive motor 24 will be capable of effecting shear rates in the annular reaction passage within the range of 50,000/sec to 500,000/sec, more usually in the range 100,000/sec to 300,000/sec. The flexible coupling 62 will be of any suitable type providing the desired characteristics for its task of providing complete axial and angular freedom of suspension. Typically the ratio Fc/Ft will have the value from 0.1 to 0.5, more usually from 0.15 to 0.3. A typical range of values for the ridge dimension A will be 0.5 mm to 2.0 mm., more usually 0.7 mm to 1.2 mm, while a typical range of values for the trough dimension B will be 2.0 mm to 5.0 mm, more usually 2.7 mm to 4.5 mm. A typical range of values for the pitch dimension P will be 2.0 mm to 10.0 mm, more usually 3.0 mm to 6.5 mm. As a very specific example a chemical reactor with which a heat exchanger of the invention was employed had a reaction passage of 250 mm in length and 0.1 mm radial gap. The stator wall had a thickness of 0.81 mm. The external diameter of the heat exchange body was 51 mm, while the dimension A, namely the radial dimension between ridges 110 and wall surface 96 was 0.79 mm and the dimension B, namely the radial dimension between troughs 114 and wall surface 96 was 2.77 mm, giving a ratio A/B of 0.285. The pitch P, namely the spacing in the flow direction between ridges 112 (and of course between the troughs 114) was 3.18 mm.

INDEX OF REFERENCE NUMERALS

Fc. Flow capacity of chamber passage portions 106.
Ft. Flow capacity of throttle forming passage portions 108
A. Radial dimension between ridges 110 and wall surface 96.
B. Radial dimension between troughs 114 and wall surface 96.
F. Pitch; spacing in the flow direction between ridges 110.
10. Flat main base member.
12. Flat sub-base plate.
14. Intermediate and stator support plate.
16. Uppermost and motor support plate.
18. Tubular spacing members between plates 12 and 14.
20. Tubular spacing members between plates 14 and 16.
22. Tie rods passing through members 18 and 20.
24. Electric drive motor.
26+ and 26−. Electric leads to motor 24.
28. Motor drive shaft.
30. Bearing.
32. Motor and reactor vertical axis of rotation.
34. Reactor tubular rotor.
36. Reactor tubular stator.
38. Cup-shaped upward-opening base member.
40. Annular intermediate member.
42. Annular body of heat exchange structure.
44. Cylindrical stator tube.
46. O-rings between tube 44 and plate 14 and member 40.
48. Cylindrical inside surface of tube 44.
50. Annular reaction passage.
52. Cylindrical inside surface of intermediate member 40.
54. Cylindrical inside surface of cup-shaped opening in member 38.
56. Rotor tube.
58. Rotor upper end member.
60. Rotor lower end member.
62. Shaft extending upward from end member 58.
64. Flexible coupling between motor drive shaft 28 and rotor 34.
66. Rotor external cylindrical operative surface.
68. Annular reaction passage.
70. Entry pipe for first reactant.
72. Entry passage from pipe 70 into member 38.
74. First reagent supply.
76. Metering pump for first reactant.
78. Second reagent supply.

80. Metering pump for second reagent.
82. Entry pipe for second reagent.
84. Annular plenum between members 38 and 40.
86. Slit shaped inlet to reaction passage 50.
88. Chamber receiving reacted reagents from passage 50.
90. Outlet pipe from reactor.
92. Reservoir receiving the reacted reagents.
94. Heat exchange fluid flow passage.
96. External cylindrical wall surface of tube 44.
98. Arrows showing flow direction of heat exchange fluid.
100. Heat exchanger pump unit.
102. Input inlet to heat exchange fluid flow passage 94.
104. Output outlet from heat exchange fluid flow passage 94.
106. Flow passage chamber portions of passage 94.
108. Throttle forming passage portions of passage 94.
110. Chamber forming ridges in passage 94.
112. Ridge crests.
114. Troughs or grooves between immediately successive ridges.
116. Barrier layer of heat exchange fluid flow.
118. Arrows indicating laminar flow eddies in heat exchange fluid flow.
120. Arrows indicating eddyless flow in heat exchange fluid.

I claim:

1. Heat exchange apparatus comprising a heat exchange wall through which heat exchange takes place from one wall surface to an opposite wall surface;
a heat exchange structure disposed at the one wall surface and providing a flow passage for the flow therein in a flow direction of heat exchange fluid in heat exchange contact with the one wall surface;
the flow passage comprising a succession of flow passage chamber portions, each of which is connected to any preceding and successive flow passage chamber portion by a respective flow passage throttle forming portion, both the chamber and the throttle forming portions having the flow passage one wall as a wall thereof, the throttle forming portions being of smaller flow cross section transverse to the flow direction than that of the connected flow passage chamber portions; whereby heat exchange fluid passing in the flow passage has a higher velocity during its passage through the throttle forming portions than in the passage chamber portions;
the apparatus also comprising means for moving the heat exchange fluid through the flow passage at a flow rate such that its velocity, at least in the throttle forming portions, is high enough to reduce the thickness of the heat exchange fluid boundary layer in the throttle portions, and thereby facilitate heat exchange from the heat exchange fluid to the one wall surface.

2. Heat exchange apparatus as claimed in claim 1, wherein the heat exchange structure comprises a heat exchanger body providing in the flow passage in the flow direction a succession of ridges each extending from a wall of the heat exchange fluid flow passage transverse to the flow direction and toward the one wall surface, each two immediately succeeding ridges in the direction of flow having a respective trough between them, each ridge having a ridge crest that is the part of the ridge closest to the one wall and each trough having a trough bottom that is the part of the trough furthest from the one wall, each ridge forming in the flow passage a corresponding throttle forming passage portion and each trough forming in the flow passage a corresponding chamber portion.

3. Heat exchange apparatus as claimed in claim 2, wherein each ridge is of triangular cross section transverse to the flow direction with a ridge crest that is convex toward the one wall, and each trough is of triangular cross section transverse to the flow direction with a trough bottom that is concave toward the one wall;
or alternatively each ridge is of triangular cross section transverse to the flow direction with a ridge crest that is truncated and convex toward the one wall and each trough is of triangular cross section transverse to the flow direction with a trough bottom that is truncated and concave toward the one wall;
or alternatively each ridge is of triangular cross section transverse to the flow direction with a ridge crest that is rounded and convex toward the one wall and each trough is of triangular cross section transverse to the flow direction with a trough bottom that is rounded and concave toward the one wall;
or alternatively each ridge is of rectangular cross section transverse to the flow direction with a ridge crest that is parallel to the one wall and each trough is of rectangular cross section transverse to the flow direction with a trough bottom that is parallel to the one wall.

4. Heat exchange apparatus as claimed in claim 2, wherein the heat exchange wall is a cylinder of uniform diameter along its length and the heat exchanger body is cylindrical having the heat exchange wall as an interior wall thereof.

5. Heat exchange apparatus as claimed in claim 4, wherein A is the radial dimension of the ridges from the heat exchange wall and B is the radial dimension of the troughs from the heat exchange wall, and the value of the ratio A/B is in the range 0.1 to 0.35.

6. Heat exchange apparatus as claimed in claim 1, in combination with a spinning tube in tube reactor comprising a tubular rotor mounted for rotation within a tubular stator coaxial therewith, the tubular stator comprising also the heat exchange wall, the reactor having an elongated transverse annular cross section reaction passage between the rotor tube exterior surface and the stator tube interior surface, through which reaction passage reactants pass to force reaction between them facilitated by the shear produced by their movement through the passage and the relative rotation between the tubes.

7. Heat exchange apparatus as claimed in claim 6, wherein the rotor is mounted for rotation within the stator solely by a flexible connection between a drive motor shaft and the rotor, the flexible connection suspending the rotor within the stator, and wherein the radial dimension of the reaction passage is sufficiently small that uniformity of that dimension is maintained along the length of the passage by the hydrodynamic effect which is operative in such a narrow passage upon rotation of the rotor.

8. Heat exchange apparatus comprising a heat exchange wall through which heat exchange takes place from one wall surface to an opposite wall surface;
a heat exchange structure disposed at the one wall surface and providing a flow passage for the flow therein in a flow direction of heat exchange fluid in heat exchange contact with the one wall surface;
the flow passage comprising a succession of flow passage chamber portions, each of which is connected to any preceding and successive flow passage chamber portion by a respective flow passage throttle forming portion, both the chamber and the throttle forming portions having the flow passage one wall as a wall thereof, the throttle forming portions being of smaller flow cross section transverse to the flow direction than that of the connected flow passage chamber portions; whereby heat exchange fluid passing in the flow passage has a higher velocity during its passage through the throttle forming portions than in the passage chamber portions;

the apparatus also comprising means for moving the heat exchange fluid through the flow passage at a flow rate such that its velocity, at least in the throttle forming portions, is high enough to at least reduce the rate of fouling of the one wall surface.

9. Heat exchange apparatus as claimed in claim 8, wherein the heat exchange structure comprises a heat exchanger body providing in the flow passage in the flow direction a succession of ridges each extending from a wall of the heat exchange fluid flow passage transverse to the flow direction and toward the one wall surface, each two immediately succeeding ridges in the direction of flow having a respective trough between them, each ridge having a ridge crest that is the part of the ridge closest to the one wall and each trough having a trough bottom that is the part of the trough furthest from the one wall, each ridge forming in the flow passage a corresponding throttle forming passage portion and each trough forming in the flow passage a corresponding chamber portion.

10. Heat exchange apparatus as claimed in claim 9, wherein each ridge is of triangular cross section transverse to the flow direction with a ridge crest that is convex toward the one wall, and each trough is of triangular cross section transverse to the flow direction with a trough bottom that is concave toward the one wall;

or alternatively each ridge is of triangular cross section transverse to the flow direction with a ridge crest that is truncated and convex toward the one wall and each trough is of triangular cross section transverse to the flow direction with a trough bottom that is truncated and concave toward the one wall;

or alternatively each ridge is of triangular cross section transverse to the flow direction with a ridge crest that is rounded and convex toward the one wall and each trough is of triangular cross section transverse to the flow direction with a trough bottom that is rounded and concave toward the one wall;

or alternatively each ridge is of rectangular cross section transverse to the flow direction with a ridge crest that is parallel to the one wall and each trough is of rectangular cross section transverse to the flow direction with a trough bottom that is parallel to the one wall.

11. Heat exchange apparatus as claimed in claim 9, wherein the heat exchange wall is a cylinder of uniform diameter along its length and the heat exchanger body is cylindrical having the heat exchange wall as an interior wall thereof.

12. Heat exchange apparatus as claimed in claim 11, wherein A is the radial dimension of the ridges from the heat exchange wall and B is the radial dimension of the troughs from the heat exchange wall, and the value of the ratio A/B is in the range 0.1 to 0.35.

13. Heat exchange apparatus as claimed in claim 8, in combination with a spinning tube in tube reactor comprising a tubular rotor mounted for rotation within a tubular stator coaxial therewith, the tubular stator comprising also the heat exchange wall, the reactor having an elongated transverse annular cross section reaction passage between the rotor tube exterior surface and the stator tube interior surface, through which reaction passage reactants pass to force reaction between them facilitated by the shear produced by their movement through the passage and the relative rotation between the tubes.

14. Heat exchange apparatus as claimed in claim 13, wherein the rotor is mounted for rotation within the stator solely by a flexible connection between a drive motor shaft and the rotor, the flexible connection suspending the rotor within the stator, and wherein the radial dimension of the reaction passage is sufficiently small that uniformity of that dimension is maintained along the length of the passage by the hydrodynamic effect which is operative in such a narrow passage upon rotation of the rotor.

15. Heat exchange apparatus comprising a heat exchange wall through which heat exchange takes place from one wall surface to an opposite wall surface;

a heat exchange structure disposed at the one wall surface and providing a flow passage for the flow therein in a flow direction of heat exchange fluid in heat exchange contact with the one wall surface;

the flow passage comprising a succession of flow passage chamber portions, each of which is connected to any preceding and successive flow passage chamber portion by a respective flow passage throttle forming portion, both the chamber and the throttle forming portions having the flow passage one wall as a wall thereof, the throttle forming portions being of smaller flow cross section transverse to the flow direction than that of the connected flow passage chamber portions; whereby heat exchange fluid passing in the flow passage has a higher velocity during its passage through the throttle forming portions than in the passage chamber portions;

the apparatus also comprising means for moving the heat exchange fluid through the flow passage at a flow rate such that the heat exchange fluid flows in the flow passage chamber portions as laminar eddies contacting the one wall surface, and that the spacing of the flow passage chamber portions along the flow passage is such that wake interference flow is established in the flow passage to thereby enhance the rate of heat exchange between the heat exchange fluid and the one wall surface.

16. Heat exchange apparatus as claimed in claim 15, wherein the heat exchange structure comprises a heat exchanger body providing in the flow passage in the flow direction a succession of ridges each extending from a wall of the heat exchange fluid flow passage transverse to the flow direction and toward the one wall surface, each two immediately succeeding ridges in the direction of flow having a respective trough between them, each ridge having a ridge crest that is the part of the ridge closest to the one wall and each trough having a trough bottom that is the part of the trough furthest from the one wall, each ridge forming in the flow passage a corresponding throttle forming passage portion and each trough forming in the flow passage a corresponding chamber portion.

17. Heat exchange apparatus as claimed in claim 16, wherein each ridge is of triangular cross section transverse to the flow direction with a ridge crest that is convex toward the one wall, and each trough is of triangular cross section transverse to the flow direction with a trough bottom that is concave toward the one wall;

or alternatively each ridge is of triangular cross section transverse to the flow direction with a ridge crest that is truncated and convex toward the one wall and each trough is of triangular cross section transverse to the flow direction with a trough bottom that is truncated and concave toward the one wall;

or alternatively each ridge is of triangular cross section transverse to the flow direction with a ridge crest that is rounded and convex toward the one wall and each trough is of triangular cross section transverse to the flow direction with a trough bottom that is rounded and concave toward the one wall;

or alternatively each ridge is of rectangular cross section transverse to the flow direction with a ridge crest that is parallel to the one wall and each trough is of rectangular cross section transverse to the flow direction with a trough bottom that is parallel to the one wall.

18. Heat exchange apparatus as claimed in claim 16, wherein the heat exchange wall is a cylinder of uniform diameter along its length and the heat exchanger body is cylindrical having the heat exchange wall as an interior wall thereof.

19. Heat exchange apparatus as claimed in claim 18, wherein A is the radial dimension of the ridges from the heat exchange wall and B is the radial dimension of the troughs from the heat exchange wall, and the value of the ratio A/B is in the range 0.1 to 0.35.

20. Heat exchange apparatus as claimed in claim 15, in combination with a spinning tube in tube reactor comprising a tubular rotor mounted for rotation within a tubular stator coaxial therewith, the tubular rotor comprising also the heat exchange wall, the reactor having an elongated transverse annular cross section reaction passage between the rotor tube exterior surface and the stator tube interior surface, through which reaction passage reactants pass to force reaction between them facilitated by the shear produced by their movement through the passage and the relative rotation between the tubes.

21. Heat exchange apparatus as claimed in claim 20, wherein the rotor is mounted for rotation within the stator solely by a flexible connection between a drive motor shaft and the rotor, the flexible connection suspending the rotor within the stator, and wherein the radial dimension of the reaction passage is sufficiently small that uniformity of that dimension is maintained along the length of the passage by the hydrodynamic effect which is operative in such a narrow passage upon rotation of the rotor.

* * * * *